Dec. 15, 1953 A. A. MARKSON 2,662,539
FLUID-COUNTERBALANCED FORCE MEASURING DEVICE
Filed Sept. 16, 1949 2 Sheets-Sheet 1
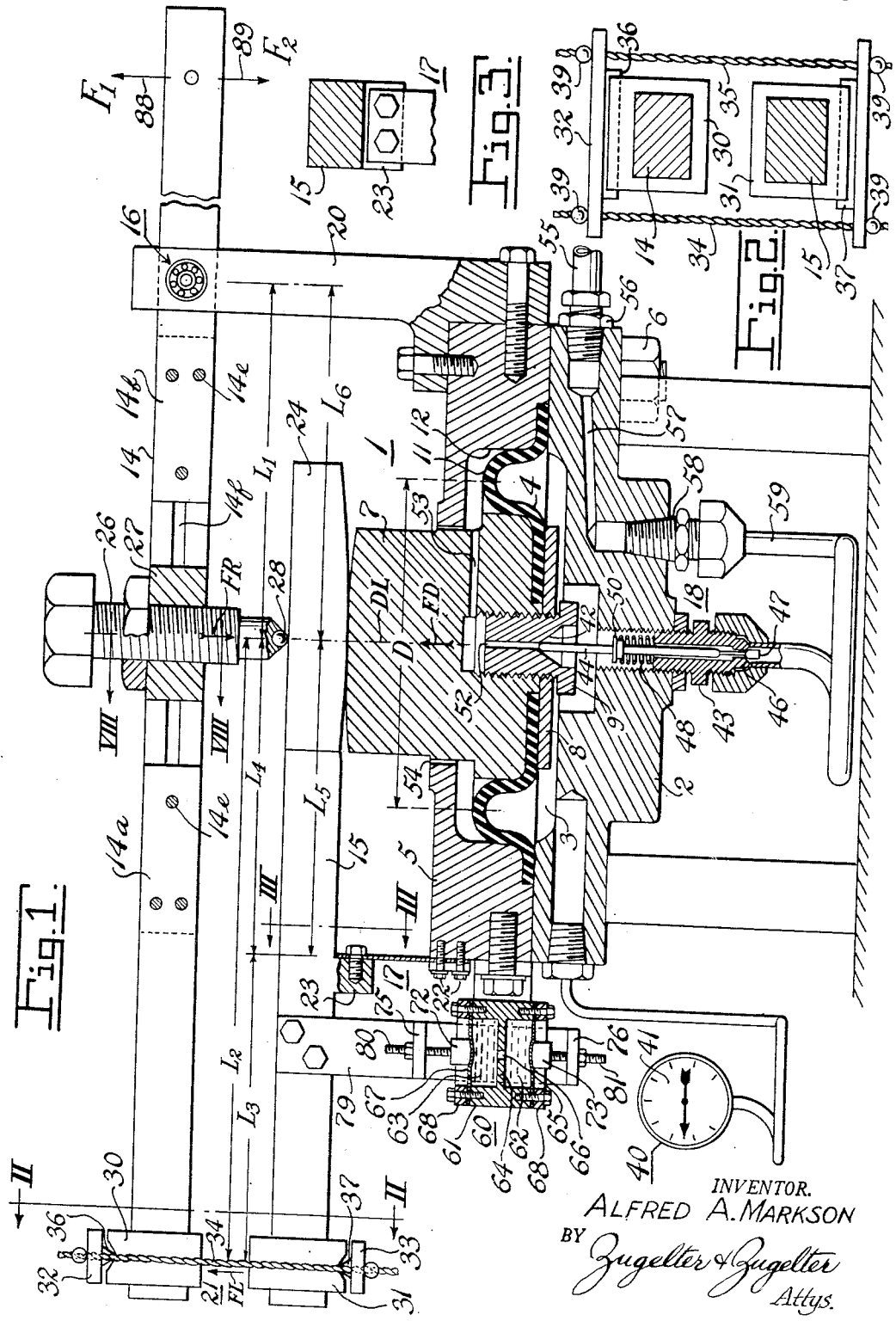
INVENTOR.
ALFRED A. MARKSON
BY Zugelter & Zugelter
Attys.

Dec. 15, 1953  A. A. MARKSON  2,662,539
FLUID-COUNTERBALANCED FORCE MEASURING DEVICE
Filed Sept. 16, 1949  2 Sheets-Sheet 2
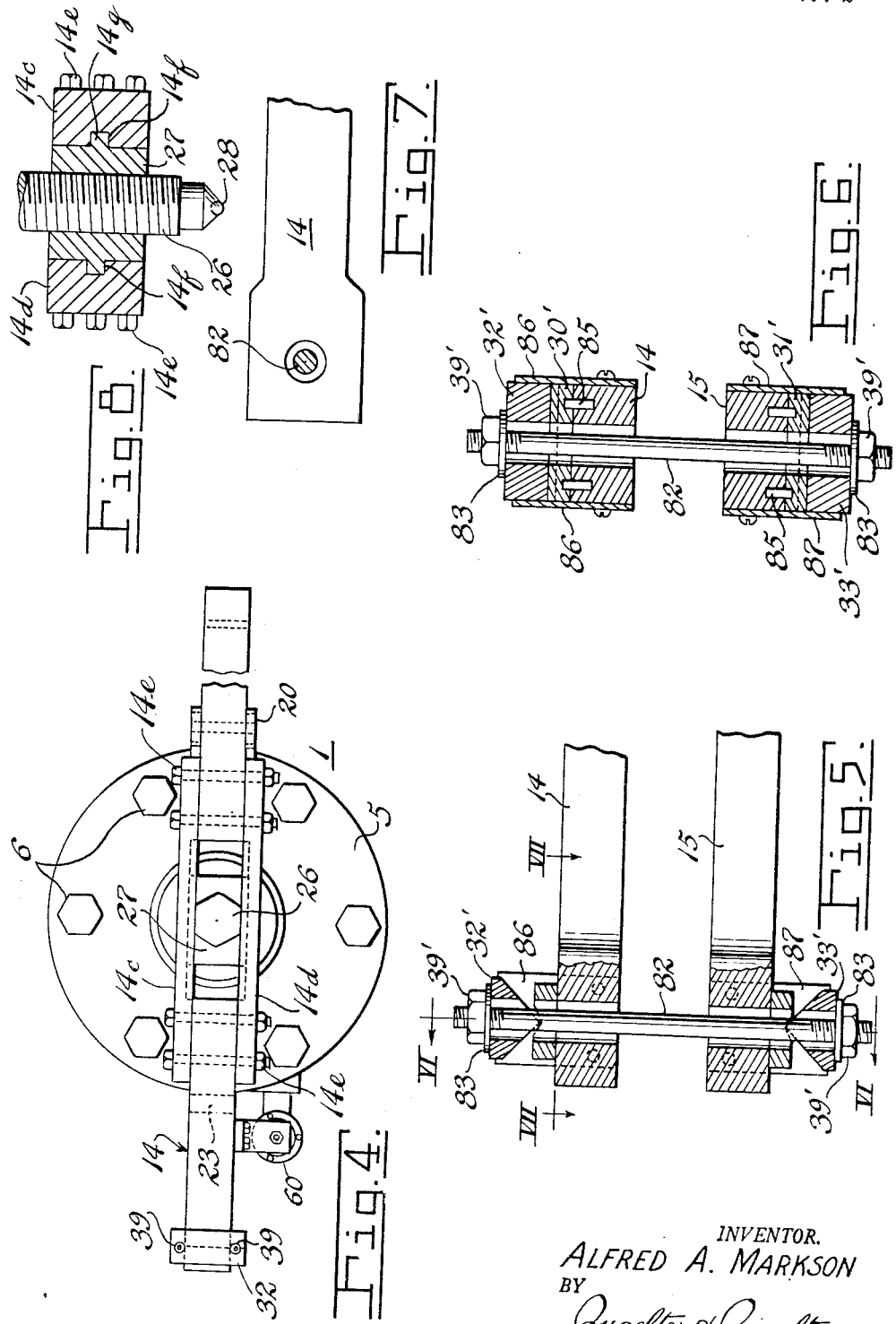
INVENTOR.
ALFRED A. MARKSON
BY
Zugelter & Zugelter
Attys.

Patented Dec. 15, 1953

2,662,539

UNITED STATES PATENT OFFICE 2,662,539

FLUID-COUNTERBALANCED FORCE MEASURING DEVICE

Alfred A. Markson, Mount Lebanon Township, Allegheny County, Pa., assignor to Hagan Corporation, Pittsburgh, Pa., a corporation of Pennsylvania Application September 16, 1949, Serial No. 115,963

2 Claims. (Cl. 137—85)

1

This invention relates to force measuring devices and more particularly to devices of the type where the force to be measured is applied on one side of a diaphragm by a pivoted or fulcrumed lever and the force is balanced by pneumatic pressure applied to the opposite side of the diaphragm, the value of the balancing pressure being directly proportional to the force being measured.

Devices of the above mentioned type are used in measuring the turning force or torque developed by the stator of an engine-testing dynamometer where the power output characteristics of an engine at various speeds, are desired. These devices are also used for many other purposes.

It often happens that the direction of thrust or turning force to be measured is reversed. In such cases the thrust measuring devices heretofore used, not being reversible in action, have either had to be re-located and re-mounted, or two such devices have been required. Where two devices have been used, one of them would measure the force or thrust when acting in one direction, and the other would measure the force when its direction was reversed, but in either case only one device was operative at one time, the other being idle. Such an arrangement was expensive, as it involved duplication of devices with only part time use of either one, and there was entailed also the problem of selecting two devices or machines having substantially identical characteristics in order that the gage reading would have the same accuracy for either direction of thrust measurement.

An object of this invention is to provide a thrust or force measuring device which is so designed and constructed that the thrust or force to be measured acts in the same direction on the diaphragm of the device even though the direction in which the force to be measured acts on said device is reversed.

Another object of the invention is to provide a single diaphragm thrust or force measuring device with means for causing the measured force to act in the same direction on the diaphragm even though the direction in which the measured force acts on the device is reversed.

A further object of the invention is to provide a force measuring device of the character set forth in the preceding objects, having means embodied therein by which desired constants can be obtained between the applied force or force to be measured and the balancing force developed by the diaphragm for direction of action of the applied force.

2

The invention resides in the novel arrangement and combination of parts as disclosed in the following specification and illustrated in the accompanying drawings in which:

Figure 1 is a view in transverse section and partly in side elevation of a force measuring device arranged and constructed in accordance with an embodiment of the invention;

Fig. 2 is a view in section taken on line II—II of Fig. 1 showing a form of uni-directional coupling embodied in the device of Fig. 1;

Fig. 3 is a fragmentary view in section taken on line III—III of Fig. 1;

Fig. 4 is a top plan view of the device shown in Fig. 1 drawn to a reduced scale;

Fig. 5 is a fragmentary view in side elevation and partly in section of the lever system of the device showing a modified form of uni-directional coupling;

Fig. 6 is a view in section taken on line VI—VI of Fig. 5;

Fig. 7 is a fragmentary view in section taken on line VII—VII of Fig. 6; and

Fig. 8 is a view in section taken on line VIII—VIII of Fig. 1.

Throughout the drawings and the specification like reference characters indicate like parts.

In Fig. 1 of the drawings is illustrated the force measuring device designated generally by reference character 1. The device comprises a diaphragm housing 2 having a cavity or chamber 3 in one face thereof which is closed by a flexible member such as diaphragm 4. The housing 2 is preferably circular in plan view, as may be seen by inspection of Fig. 4 and the diaphragm is correspondingly shaped. The marginal edge of the diaphragm is clamped between the rim portion of housing 2 and a clamp ring 5, the clamp ring being secured to the housing by means of bolts or cap screws 6 uniformly spaced around the periphery thereof. The central portion of the diaphragm is clamped between a thrust member or block 7 and a backing plate 8, the backing plate and block being pulled tightly together by means of a threaded bolt-like member 9 which passes through plate 8 and is threaded into the thrust block 7.

It is preferred that the diaphragm 4 be made of reinforced rubber either natural or synthetic, and that it be a pre-formed or pre-shaped diaphragm having a slack portion 11 of substantially U-shape, the outer walls of which are in engagement with the sides of the thrust block 7 and an annular wall 12 of clamp ring 5. By employing a pre-formed diaphragm which is supported at the sides of the U-shaped slack portion, the effective diameter D of the diaphragm remains substantially constant throughout the operating range of the device, thereby insuring accuracy of force measurement.

The force or thrust to be measured is imposed on thrust block 7 by means of a plurality of levers 14 and 15 mounted on fulcrums or pivots 16 and 17, respectively. Lever 14 may be regarded as a primary lever and lever 15 as a secondary lever. As shown, and assuming that device 1 is so mounted that the thrust block 7 is on the top side thereof, levers 14 and 15 are disposed one above the other in spaced relation in substantially the same vertical plane. Also as shown, fulcrums 16 and 17 are disposed on diametrically opposite sides of the diaphragm housing. The arrangement of these levers is such that regardless of whether the force is acting in a direction to turn the lever to which it is applied either clockwise or counter-clockwise about its fulcrum, the force imposed on the diaphragm acts in the same direction, namely, downwardly. The force acting downwardly on the thrust block 7 and the diaphragm, results in movement of the central portion of the diaphragm. This movement is utilized to actuate a valve 18 arranged and constructed to so control the magnitude of the pressure in diaphragm chamber or cavity 3 that the force of that pressure as exerted on the effective area of the diaphragm will balance the force acting downwardly on the thrust block 7. Valve 18 is connected to a source of supply of fluid under pressure, say, compressed air. The pressure of the source may be as high as required—60 pounds per sq. in. pressure being suitable. The valve will adjust the pressure in chamber 3 to values between atmospheric and the value of the source pressure, depending on the value of the applied force. A detailed description of valve 18 will be given later herein.

As shown in Fig. 1, lever 14 is supported by a standard or bracket 20 rigidly secured to a part of the device, as to the clamp ring 5, for example. The fulcrum 16 for the lever is preferably an anti-friction fulcrum and may comprise an anti-friction bearing such as a ball bearing or a double acting knife edge bearing. Lever 14 is disposed above and extends crosswise of the diaphragm housing and thrust block 7 and its free or left hand end is coupled to one end of lever 15 by means of a force reversing or uni-directional coupling 21.

Lever 15 is also preferably mounted on an anti-friction or substantially frictionless fulcrum. As shown, fulcrum 17 comprises a flexible rectangular strip of metal, such as spring steel, the lower end of which is secured to the clamp ring 5 by means of cap screws or bolts 22. The upper end of fulcrum 17 is secured to a lug 23 projecting downwardly from the under side of lever 15. The right hand end of lever 15, as seen in Fig. 1, is provided with a bearing portion 24 that rests on the thrust block 7. The bearing surface of portion 24 may be flat or cylindrical as indicated. If cylindrical, it is preferred that the radius be large. The surface of bearing member 7 on which lever portion 24 bears, may also be cylindrical the axis of the surface being parallel to the axis of the adjacent surface of portion 24. The surface if cylindrical preferably has a large radius. Thus the cylindrical surfaces of block 7 and portion 24 will engage each other on a line contained in a plane passing through the center of the diaphragm.

Lever 14 is provided with a bearing member 26 which is adjustable lengthwise of the lever and located between fulcrums 16 and 17, so that it can bear on portion 24 of lever 15 when the force to be measured is applied to lever 14 in one direction.

Bearing member 26 may comprise a cap screw which is threaded through a block 27 and provided at its lower end with a bearing surface preferably in the form of a ball or sphere 28.

Lever 14 comprises parts 14a and 14b the adjacent ends of which are spaced to accommodate a block 27, and plates 14c and 14d. Plates 14c and 14d are on opposite sides of and secured to parts 14a and 14b by bolts 14e and overlap the ends of parts 14a and 14b. The inner faces of plates 14c and 14d are provided with grooves 14f in which ribs or tongues 14g on opposite sides of block 27 register and hold the block in place. By loosening the bolts, block 27 may be adjusted lengthwise of the space between the adjacent ends of lever parts 14a and 14b whereby the point of bearing of ball 28 on lever part 24 may be adjusted with respect to the true center of diaphragm 4 and fulcrums 16 and 17.

With a system of levers arranged as above described, a plurality of lever arms is formed and are designated $L_1$ to $L_6$ inclusive. These lever arms and their effect on the performance of device 1 will be discussed later herein.

The uni-directional coupling 21 comprises bearing blocks 30 and 31 secured to adjacent portions of levers 14 and 15, respectively, knife edge members 32 and 33 and flexible tension members 34 and 35 secured to the knife edge members 32 and 33, respectively. As shown in Figs. 1 and 2, bearing block 30 is provided with a V-shaped groove in which the knife edge 36 of knife edge member 32 is received. Similarly, bearing block 31 is provided with a V-shaped groove in which a knife edge 37 of knife edge member 33 is received. Knife edge member 33 acts upwardly on the under side of lever 15 while knife edge member 32 acts downwardly on the upper side of lever 14.

As shown in Fig. 2, knife edge members 32 and 33 are wider than bearing blocks 30 and 31 and that the flexible tension members 34 and 35 pass through apertures in these members and that the flexible members are provided with abutments 39 that bear on the underside of knife edge members 33 and on the upper side of knife edge member 32. Thus it will be apparent that if a force is applied to lever 14 tending to turn it clockwise about its fulcrum 16 that members 34 and 35 will be stressed in tension thereby tending to turn lever 15 clockwise also about its fulcrum. If the force applied to lever 14 is in a direction to turn it or tend to turn it counter-clockwise about its fulcrum 16, tension in members 34 and 35 is released whereby no force is transmitted from lever 14 to lever 15 through the uni-directional coupling 21. If the force applied to lever 14 is in a direction to turn or tend to turn it counter-clockwise about its fulcrum 16, lever 14 exerts a thrust on the diaphragm directly through bearing member 26 and bearing portion 24 of lever 15 to the thrust block 7.

If the force applied to lever 15 is in a direction tending to turn it clockwise about its fulcrum 16, the uni-directional coupling 21 through its tension members 34 and 35 will impose a turning force tending to turn it clockwise about its fulcrum 17. Thus the force applied to lever 14 is transmitted to the diaphragm 4 through the uni-directional coupling 21, fulcrum 17 and lever 15. Whichever direction the applied force to be measured acts on lever 14, the resulting thrust on diaphragm 4 is always in the same direction, namely, downwardly, and for every value of measured force applied, there will be a corresponding value of pressure developed in the diaphragm housing 2. The value of this pressure will be such that the total force exerted thereon on the diaphragm will balance the applied force or the thrust of the force applied to lever 14. The value of the pressure in the diaphragm housing will therefore be a direct measure of or directly proportional to, the value or magnitude of the applied force or thrust. By employing a pressure gage 40 having a suitably calibrated dial 41, the magnitude of the measured force may be read directly.

Valve 18 comprises the threaded member 9 in which is formed an exhaust port valve seat 42, a valve body 43 threaded into a tapped opening in the diaphragm housing 2 and a valve stem 44. The outermost end of the valve body is provided with an inlet port seat 46 and valve stem 44 is provided with a valve element 47 adapted to seat on the inlet port seat. A light compression spring 48 may be provided for urging the valve stem in a direction to seat element 47 on the inlet port. This spring may be disposed between a flanged collar 50 secured to the stem and the innermost end of the valve body. The exhaust port seat 42 communicates with a passageway 52 in member 9 that communicates with a lateral passageway 53 in the thrust block. This passageway discharges to the atmosphere, through the annular space 54 between the clamp ring 5 and the thrust block 7.

When diaphragm 4 is in neutral or balanced position both the exhaust and inlet ports are closed. If the thrust on the diaphragm increases beyond the balancing force exerted by the pressure on the diaphragm the thrust block and diaphragm move downwardly whereby the valve stem is actuated to open the inlet port and allow pressure medium to enter the diaphragm chamber until the pressure therein has built up to a value sufficient for the pressure force to balance the applied force being measured. When balance occurs the inlet port of the valve is closed. If the thrust of the force being measured decreases from a state of balance, then the force of the pressure in chamber 3 will exceed the thrust force and cause the diaphragm with its thrust block to move upwardly and unseat the valve stem from the exhaust port seat, thereby allowing pressure to escape to the atmosphere and causing the pressure in chamber 3 to decrease. When the pressure in chamber 3 has decreased to a value at which the force of the pressure acting on the diaphragm is in balance with the thrust force the exhaust port will be closed.

The source of supply of pressure may be delivered to the inlet of the valve through a supply pipe 55 which is connected to a fitting 56 threaded into an edge of the diaphragm housing. This fitting communicates through a passageway 57 with another fitting 58 that is threaded into the housing at a point adjacent the valve body. Fitting 58 is connected by a tube or pipe 59 to the valve body as shown.

In order to prevent vibration of the diaphragm and valve which would seriously impair the accuracy and precision of the device, a damping means 60 is provided. Damping means 60 comprises a housing 61 having chambers 62 and 63 therein which are separated by a partition 64 having an aperture or orifice 65 therein. The chambers 62 and 63 open in opposite directions and their open ends are closed by diaphragms 66 and 67, respectively. The marginal edges of these diaphragms are clamped to the housing by means of clamping rings 68 and cap screws or other suitable means. The housing may be secured to the clamp ring 5 by means of screws or bolts as shown, which is a stationary part of the device 1. Chambers 62 and 63 are filled with a viscous fluid such as a suitable oil, the viscosity of which is not appreciably affected by changes in temperature. By flexing one or the other of the diaphragms inwardly towards the partition, oil is displaced through orifice 65 from one chamber to the other. The diaphragms are flexed by means of compressor members 72 and 73, respectively, which bear on the diaphragms and are secured to horizontally extending flanges 75 and 76 of a C-shaped support. The C-shaped support is provided with a stem or shank 79 that is secured to a movable part of device 1, as lever 15, for example. As shown, compressor members 72 and 73 are provided with stems 80 and 81 which have threaded engagement with the flanges 75 and 76, respectively. By adjusting stems 80 and 81 the initial pressure exerted by these compressor members on the diaphragms may be pre-adjusted.

Movement of the lever 15 in either direction about its fulcrum 17 results in flexing of the diaphragms 66 and 67 with corresponding displacement of fluid from one chamber to the other through orifice 65, whereby the valve and diaphragm of the device are stabilized and vibration prevented. The vibration occurs if the inlet and exhaust ports of the valve are set in motion whereby they are opened and closed rapidly, resulting in high frequency vibration of the moving parts of device 1.

In Figs. 5, 6 and 7 is illustrated a modified form of uni-directional coupling. Instead of using flexible members comprising, for example, twisted wire cable such as is illustrated in Figs. 1 and 2, a tension rod 82 may be employed. The tension rod, as shown, passes through ways in levers 14 and 15 that are larger than the diameter of the rod so that it will not bind therein in response to movement of the levers. The opposite ends of the tension rod 82 passes through ways in the knife edge members 32' and 33', respectively, and are provided with abutments 39' in the form of nuts which are threaded onto the ends of the rod. Suitable bearing washers 83 may be interposed between the knife edge members 32' and 33' and the abutments 39', if desired. As shown in Fig. 6, the knife edge bearing members 30' and 31' may be secured to the upper and lower faces of levers 14 and 15, respectively, by means of dowel pins 85. Lateral displacement of the knife edge members 32' and 33' may be limited by means of thrust plates 86 and 87 secured to the opposite sides of levers 14 and 15, respectively.

As stated earlier herein the adjustment of the lengths of the lever arms $L_1$ to $L_6$ determines the performance of device 1. The lengths of lever arms $L_1$ to $L_6$ as shown in Fig. 1 of the drawings, may be defined as follows:

$L_1$ is the length of the lever arm measured between a vertical plane passing through the point of contact between ball 28 and portion 24 of lever 15 and a vertical plane passing through the center of fulcrum 16. The length of this arm is adjustable by means of block 27.

$L_2$ is the length of the lever arm measured between the line of action of coupling 21 on levers 14 and 15 and the point of contact between ball 28 and part 24. The length of this arm is determined by the position of ball 28 or the position of coupling 21.

$L_3$ is the length of the lever arm measured between the line of action of coupling 21 on levers 14 and 15 and fulcrum 17, and is determined by the position of the coupling 21 on these levers.

$L_4$ is the length of the lever arm measured from the fulcrum 17 to the point of contact of ball 28 with lever portion 24.

$L_5$ and $L_6$ are the lengths of the lever arms as measured from fulcrums 17 and 16, respectively, to the true center of diaphragm 4, this center being indicated by a dot-dash line DL. The lengths of these lever arms remain fixed in a given design of device 1. The force exerted by the pressure in chamber 3 on diaphragm 4 acts through the center DL of the diaphragm. I prefer that fulcrum 17 be stressed in tension, therefore lever arm $L_6$ should be longer than lever arm $L_5$. Under ordinary circumstances, adjustments are so made that lever arm $L_4$ is either greater than or equal to lever arm $L_5$. However, lever arm $L_4$ may be shorter or less than arm $L_5$ because fulcrum 17 as constructed can take some compression load.

If it be assumed that the force $F_1$ to be measured acts in the direction of arrow 88 at unit distance from fulcrum 16 a series of equations may be developed. In these equations the lever systems and the forces acting therein are assumed to be in balance with the applied force $F_1$ or $F_2$, that $F_D$ is the force exerted by the pressure acting on the effective area of the diaphragm 4, that $F_R$ is the force exerted by bearing 28 on lever portion 24, and that $F_L$ is the force acting through coupling 21.

The equations follow:

$$F_1 \cdot 1 = F_R L_1 \text{ or } F_1 = F_R L_1$$

$$F_R L_4 = F_D \cdot L_5 \text{ and } F_R = \frac{F_D \cdot L_5}{L_4}$$

Since $F_D$ always acts through the center of diaphragm 4, then $$F_1 = \frac{F_D \cdot L_5}{L_4} \cdot L_1 \text{ and } \frac{F_1}{F_D} = \frac{L_5 \cdot L_1}{L_4}$$

If the force to be measured is reversed and designated $F_2$ when it acts in the direction of arrow 89 then $$F_2 \cdot 1 = F_L \cdot (L_1 + L_2), \text{ or } F_2 = F_L \cdot (L_1 + L_2)$$

$$F_L \cdot L_3 = F_D \cdot L_5 \therefore F_L = F_D \cdot \frac{L_5}{L_3}$$

$$F_2 = F_D \cdot \frac{L_5}{L_3}(L_1 + L_2)$$

and $$\frac{F_2}{F_D} = \frac{L_5}{L_3} \cdot (L_1 + L_2)$$

If the ratio of $$\frac{F_1}{F_D}$$

is equal to the ratio of $$\frac{F_1}{F_D}$$

then $$\frac{L_5}{L_3} \cdot (L_1 + L_2) = \frac{L_5 L_1}{L_4}$$

or $$\frac{L_1 + L_3}{L_3} = \frac{L_1}{L_4}$$

Since $L_1 + L_3 > L_3$, it follows for this condition that $L_1 > L_4$. If, for example $L_3$, by choice is made equal to $L_1$ then if $L_1 = 2L_5$, ball 28 will act at the center of diaphragm 4 and equal forces $F_1$ or $F_2$ will result in the same value of balancing pressure in chamber 3 and equal diaphragm forces $F_D$. Therefore, $F_D = KP$ where K is a constant and P the pressure in pounds per sq. in. gauge in chamber 3, and $K_1 F_1 = KP$ and $$F_1 = \frac{KP}{K_1} = K_3 P$$

Likewise $$F_2 = \frac{KP}{K_2} = K_3 P$$

where $K_1$, $K_2$ are constants and $K_3$ is a constant having a value $$\frac{K}{K_1} \text{ or } \frac{K}{K_2}$$

By the arrangement of levers shown, and because the bearing or ball 28 is adjustable lengthwise of lever 14, not only equal output or balancing pressures in chamber 3 may be obtained for equal values of $F_1$ and $F_2$, but also output or balancing pressures resulting from the forces $F_1$ or $F_2$ that bear designated or predetermined ratios to each other and to the forces $F_1$ and $F_2$.

The device disclosed in the drawings may be used to measure the thrust of dynamometers, jet engines and various other machines and it will measure these thrusts even though the direction of the thrust is reversed, on a single diaphragm by reason of the force reversing mechanism embodied in the lever system employed.

Having thus described the invention it will be apparent to those skilled in this art that various modifications and changes may be made in the illustrated embodiment without departing from either the spirit or the scope of the invention. Therefore, what is claimed as new and desired to be secured by Letters Patent is:

1. A thrust measuring device comprising a housing having a flexible diaphragm secured thereto to provide a pressure tight chamber within the housing, a valve actuated in response to movement of said diaphragm from a predetermined position for admitting pressure to said chamber when the diaphragm moves in one direction and exhausting pressure therefrom when the diaphragm moves in the opposite direction from said predetermined position, a plurality of levers each having a fulcrum and a bearing connection with said diaphragm, and a uni-directional coupling between said levers adapted to transfer a thrust applied to one of said levers through another of said levers on said diaphragm when a force to be measured is applied to one of said levers in one direction, and to disconnect said levers and cause the thrust to be applied directly on said diaphragm by the lever to which the force to be measured is applied when that force acts on said lever in the opposite direction, said uni-directional coupling comprising a knife edge for each lever, said knife edges being seated on opposite edges of said levers and that said levers and knife edges are connected by tension members that are slidable in said knife edges when the levers move towards each other, said tension members being stressed in tension to urge said knife edges against their respective levers when said levers tend to move away from each other.

2. A thrust measuring device comprising a housing having a flexible diaphragm secured thereto to provide a pressure tight chamber within the housing, a valve actuated in response to movement of said diaphragm from a predetermined position for admitting pressure to said chamber when the diaphragm moves in one direction and exhausting pressure therefrom when the diaphragm moves in the opposite direction from said predetermined position, a plurality of levers each having a fulcrum and a bearing connection with said diaphragm, and a uni-directional coupling between said levers adapted to transfer a thrust applied to one of said levers through another of said levers on said diaphragm when a force to be measured is applied to one of said levers in one direction, and to disconnect said levers and cause the thrust to be applied directly on said diaphragm by the lever to which the force to be measured is applied when that force acts on said lever in the opposite direction, said uni-directional coupling comprising a knife edge for each lever, said knife edges being seated on opposite edges of said levers and that said levers and knife edges are connected by a tension rod that extends through apertures in said knife edges and levers and is provided with stops that bear on opposed faces of said knife edges to urge said knife edges into engagement when the levers tend to move away from each other, said rods being slidable in said apertures to release said knife edges from their respective levers when the levers move towards each other.

ALFRED A. MARKSON.

References Cited in the file of this patent

UNITED STATES PATENTS

| Number | Name | Date |
|---|---|---|
| 2,042,374 | Wunsch et al. | May 26, 1936 |
| 2,276,505 | Moore | Mar. 17, 1942 |
| 2,304,783 | Donaldson | Dec. 15, 1942 |
| 2,369,463 | Ibbott | Feb. 13, 1945 |
| 2,451,425 | Allwein | Oct. 12, 1948 |
| 2,493,012 | Moore et al. | Jan. 3, 1950 |
| 2,524,602 | Rosenberger | Oct. 3, 1950 |
| 2,529,883 | Otto | Nov. 14, 1950 |

FOREIGN PATENTS

| Number | Country | Date |
|---|---|---|
| 642,711 | France | Sept. 3, 1928 |